(12) United States Patent
Eichinger et al.

(10) Patent No.: US 11,703,313 B2
(45) Date of Patent: Jul. 18, 2023

(54) DETECTION DEVICE FOR DETECTING A DEFORMATION OF A HOUSING OF A HIGH-VOLTAGE ACCUMULATOR OF A MOTOR VEHICLE

(71) Applicant: Bayerische Motoren Werke Aktiengesellschaft, Munich (DE)

(72) Inventors: Sebastian Eichinger, Neufahrn (DE); Andreas Fuchs, Munich (DE); Felix Laasch, Munich (DE); Florian Pritscher, Munich (DE); Jan Philipp Schmidt, Holzmaden (DE); Tobias Schmieg, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 328 days.

(21) Appl. No.: 16/959,318

(22) PCT Filed: Jan. 16, 2019

(86) PCT No.: PCT/EP2019/050989
§ 371 (c)(1),
(2) Date: Jun. 30, 2020

(87) PCT Pub. No.: WO2019/141698
PCT Pub. Date: Jul. 25, 2019

(65) Prior Publication Data
US 2020/0370876 A1 Nov. 26, 2020

(30) Foreign Application Priority Data
Jan. 22, 2018 (DE) .................. 10 2018 200 919.8

(51) Int. Cl.
*H01M 10/42* (2006.01)
*G01B 7/16* (2006.01)
*H01M 10/48* (2006.01)

(52) U.S. Cl.
CPC ............... *G01B 7/22* (2013.01); *G01B 7/18* (2013.01); *H01M 10/4285* (2013.01);
(Continued)

(58) Field of Classification Search
CPC ....... G01B 7/22; G01B 7/18; H01M 10/4285; H01M 10/48; H01M 2220/20
(Continued)

(56) References Cited

U.S. PATENT DOCUMENTS

2013/0295419 A1* 11/2013 Kwon ................ G01R 31/36
429/10
2014/0106184 A1 4/2014 Xie et al.
(Continued)

FOREIGN PATENT DOCUMENTS

CN 103018681 A 4/2013
CN 104272493 A 1/2015
(Continued)

OTHER PUBLICATIONS

International Search Report (PCT/ISA/210) issued in PCT Application No. PCT/EP2019/050989 dated Mar. 21, 2019 with English translation (seven pages).

(Continued)

*Primary Examiner* — Lee E Rodak
*Assistant Examiner* — Trung Q Nguyen
(74) *Attorney, Agent, or Firm* — Crowell & Moring LLP

(57) ABSTRACT

A detection device detects a mechanical deformation of a high-voltage accumulator of a motor vehicle, and includes: a sensor element, which senses an electrical measurement variable, wherein the sensor element is substantially flat and is attached at least partially to a first component of the high-voltage accumulator; and an evaluation device for analyzing the electrical measurement variable between the sensor element and a second component of the high-voltage (Continued)

accumulator and for outputting a corresponding warning on the basis of the electrical measurement variable, wherein at least one region of the surface of the second component is electrically conductive.

18 Claims, 2 Drawing Sheets

(52) U.S. Cl.
CPC ......... *H01M 10/48* (2013.01); *H01M 10/488* (2013.01); *H01M 2220/20* (2013.01)

(58) Field of Classification Search
USPC ....... 324/400–434, 500, 600, 764.01, 103 R, 324/771, 761.01, 639, 642, 671, 702, 324/76.11, 76.66, 96
See application file for complete search history.

(56) References Cited

U.S. PATENT DOCUMENTS

| | | | |
|---|---|---|---|
| 2014/0227570 A1* | 8/2014 | Hoshi | H01M 10/486 429/90 |
| 2015/0132621 A1 | 5/2015 | Henrici et al. | |
| 2018/0079316 A1* | 3/2018 | De Lira | B60L 50/66 |
| 2020/0091569 A1 | 3/2020 | Sauerteig et al. | |

FOREIGN PATENT DOCUMENTS

| | | |
|---|---|---|
| CN | 103733419 A | 4/2015 |
| CN | 106960984 A | 7/2017 |
| DE | 10 2011 089 977 A1 | 6/2013 |
| DE | 10 2012 207 999 A1 | 11/2013 |
| DE | 10 2013 216 076 A1 | 2/2015 |
| DE | 10 2015 215 091 A1 | 2/2017 |
| DE | 10 2017 212 273 A1 | 1/2019 |
| KR | 10-2013-0051205 A | 5/2013 |

OTHER PUBLICATIONS

German-language Written Opinion (PCT/ISA/237) issued in PCT Application No. PCT/EP2019/050989 dated Mar. 21, 2019 (10 pages).

German-language Search Report issued in German Application No. 10 2018 200 919.8 dated Jun. 28, 2018 with partial English translation (13 pages).

Chinese-language Office Action issued in Chinese Application No. 201980005685.X dated Mar. 29, 2021 with English translation (19 pages).

\* cited by examiner

DETECTION DEVICE FOR DETECTING A DEFORMATION OF A HOUSING OF A HIGH-VOLTAGE ACCUMULATOR OF A MOTOR VEHICLE

BACKGROUND AND SUMMARY OF THE INVENTION

The present invention relates to a detection device for detecting a deformation of a housing of a high-voltage accumulator of a motor vehicle, a high-voltage accumulator provided with such a detection device and a motor vehicle equipped with a corresponding high-voltage accumulator.

Previous electric vehicles or hybrid vehicles have not had the possibility of detecting damage to or deformation of the high-voltage accumulator or the housing thereof, which does not lead to a direct safety-critical state or even an outage of the system containing the high-voltage accumulator. By way of example, a possible reason for such a deformation lies in the interaction with a foreign body in the case of a high-voltage accumulator of the motor vehicle installed in the underbody.

According to the state of the art, the risk of safety-critical damage to the high-voltage accumulator is accommodated by mechanically designing the high-voltage accumulator very robustly with its housing and by locating the high-voltage accumulator in advantageous fashion, i.e., installing the latter with sufficient underbody clearance. Minor damage to the high-voltage accumulator or the housing thereof, which may lead to damage at a later time, can only be detected by means of an optical examination. By contrast, a detection on part of the system or even a request for an optical examination is not implemented.

The robustness in respect of the mechanical design currently required for managing the risk in the case of damage leads to mechanical over-dimensioning in relation to the normal driving operation. As a result of the specifically chosen design and the testing thereof by means of a test, for example by a deliberately brought about collision with a hard object, it is not possible to ensure that there is no damage to safety-critical component parts during "normal" driving operation. This implies high development costs and potentials for reducing the vehicle weight and production costs cannot be exploited on account of the over-dimensioning. Moreover, the installation of the high-voltage accumulator in regions of the motor vehicle that are less susceptible to damage leads to significant restrictions in the vehicle configuration, functionality—range, in particular—and vehicle design. Further, how critical a possibly occurred deformation of the high-voltage accumulator is for the safety of the motor vehicle cannot be detected.

The present invention is based on the object of specifying a cost-effective detection device for detecting a deformation of a housing of a high-voltage accumulator of a motor vehicle, which allows the detection of deformations of a housing of a high-voltage accumulator with greatest possible differentiation in order to be able to exploit the available play in the design and the configuration of the high-voltage accumulator to the best possible extent. The installation space and the weight of the high-voltage accumulator should not be increased, or at least not increased significantly, by the structure for identifying contact.

This object is achieved by a detection device for detecting a deformation of a housing of a high-voltage accumulator of a motor vehicle, by the high-voltage accumulator, and by the electric vehicle or the hybrid vehicle, according to the claimed invention.

According to the invention, a detection device for detecting a mechanical deformation of a high-voltage accumulator of a motor vehicle comprises a sensor element, which detects an electrical measured quantity, wherein the sensor element has a substantially flat embodiment and is applied, at least in part, to a component of the high-voltage accumulator; and an evaluation device for analyzing the electrical measured quantity between the sensor element and a second component of the high-voltage accumulator and for outputting an appropriate warning message on the basis of the electrical measured quantity, wherein at least a region of the surface of the second component is electrically conductive.

To this end, the evaluation device is configured in such a way that it outputs a warning message should the measured resistance be increased to a value from an initial value corresponding to a non-deformed state of the housing.

The warning message is a warning corresponding to a deformation of the housing including mechanical contact of the sensor element with the component part of the high-voltage accumulator to be checked.

By way of example, the warning message can be acoustic by way of a loudspeaker and/or visual on a monitor and/or an appropriate data record in a diagnostic device or controller of the high-voltage accumulator or the motor vehicle. Dielectric elastomeric sensors can be provided in an electrically insulating layer or can form such a layer.

Consequently, the present invention offers the advantage that possible damage to component parts can also be detected in the case of a deformation of the housing of the high-voltage accumulator of the motor vehicle. Appropriate measures or functions for warning the users of the motor vehicle can be initiated on the basis of this identification and so an improvement in the safety level of the motor vehicle can be reached. The production costs arising for the implementation of the sensor element according to the invention and the evaluation device, and the additional outlay as a result of an increased weight can be over-compensated by a reduction in the mechanical configuration of the high-voltage accumulator and the housing thereof, rendered possible according to the invention. Moreover, further installation space in the vehicle can be used to house at least some of the high-voltage accumulator there as a result of improvements in the reliability of the diagnosis. This results in advantages in the vehicle configuration and can be used, inter alia, for increasing the range of the motor vehicle. Since the sensor element has an electrically conductive layer and is applied to a component of the high-voltage accumulator, the realization of the detection device is very cost-effective and the design of the detection device or the application of the sensor element is very simple. Therefore, the production costs can also be reduced.

According to an advantageous development of the invention, the sensor element has a metal film or an electrically conductive lacquer. The metal film and the electrically conductive lacquer are both cost-effective options for realizing the detection device. Moreover, the metal film can be applied very easily to the component of the high-voltage accumulator and the electrically conductive lacquer also has advantages, e.g., stability and simple production.

According to an advantageous development of the invention, the first component and/or the second component are embodied as a housing of the high-voltage accumulator or a cell module of the high-voltage accumulator or a cooler of the high-voltage accumulator or an electronic component or a protection against contact for the high-voltage accumulator or a protection against vibrations for the high-voltage accumulator.

This allows targeted monitoring as to whether, e.g., safety-critical component parts—such as, inter alia, the cell module, the housing or electrical or electronic components provided therefor—are affected. This offers the advantage that any deformation of the various parts of the high-voltage accumulator upon impact by an object can be detected in targeted fashion.

According to an advantageous development of the invention, the sensor element can be attached to the inner side of the housing, for example to the base of the housing. This offers the advantage that any deformation of the housing when an object impacts from below can be detected by mechanical contacting between the housing and an inner component of the high-voltage accumulator.

According to an advantageous development of the invention, the second component has at least one electrically conductive sensor area.

According to an advantageous development of the invention, the protection against contact for the high-voltage accumulator and/or the protection against vibrations for the high-voltage accumulator has at least one chamber, which serves as a holding device of the electrically conductive sensor area.

According to an advantageous configuration, the detection device comprises an electrically insulating layer, wherein the electrically insulating layer is provided between the component of the high-voltage accumulator and the sensor element.

According to an advantageous development of the invention, the sensor element is provided with at least one measuring contact for obtaining and outputting an electrical measured quantity detected by the sensor element.

According to an advantageous development of the invention, the evaluation device comprises a voltage measuring device, resistance measuring device or capacitance measuring device for measuring the electrical measured quantity present between the sensor element and a second measuring contact at the second component.

According to an advantageous development of the invention, the evaluation device detects the time curve of the electrical measured quantity.

According to an advantageous development of the invention, the evaluation device can distinguish between mechanical contacting and an accumulation of an electrically conductive liquid in the high-voltage accumulator by the electrical measured quantity and the time curve thereof.

According to an advantageous development of the invention, the evaluation device decides that mechanical contacting has occurred if the time duration of exceeding or dropping below a threshold defined in advance is less than 500 ms, more particularly less than 100 ms.

According to an advantageous development of the invention, the evaluation device decides that an accumulation of electrically conductive liquid in the high-voltage accumulator has occurred if the time duration of exceeding or dropping below a threshold defined in advance is more than 500 ms, more particularly more than 1000 ms.

In addition to the evaluation of the aforementioned measured quantities, it is also possible to take account of the period of time during which there is contacting between the housing of the high-voltage accumulator and a component part, for example. By way of example, a contact time between 10 ms and 50 ms can be considered a medium deformation and hence medium damage, while a serious defect can be assumed in the case of an even longer contact time (50 ms-100 ms).

The evaluation device of the sensor element should be configured to allow the period of time of a threshold being exceeded by the electrical measured quantity to be detected. This facilitates the differentiation between the two patterns of damage of "mechanical deformation" and "detection of an electrically conductive liquid accumulation". On account of the elastic deformation component in the case of a mechanical deformation, the electrical measured quantity exceeds the threshold for only a short period of time in the case of small to moderate events. This lies in the range below 500 ms, typically below 100 ms. As a consequence, a first warning message with mid urgency can be output to the driver, for example to recommend a timely visit to a workshop.

In the case of a relevant collection of electrically conductive liquid, this period of time lies in the range greater than 500 ms, typically greater than 1 second. Elevated safety criticality arises on account of the risk of a cell-internal short circuit as a consequence of a pronounced deformation or on account of the risk of hydrogen formation and maybe a subsequent oxyhydrogen ignition or explosion as a consequence of an accumulation of electrically conductive liquid. As a result of the distinction in time, a second warning message of high urgency can be output to the driver, e.g., with a request to immediately switch off and leave the vehicle.

According to the invention, the insulation layer protrudes over the conductive sensor area and thus ensures the observance of the clearance and creepage distances to the component of the high-voltage accumulator to which the sensor has been applied. The electrical resistance between the sensor area and the main component can be set by lengthening or shortening this protrusion in such a way that no fault arises in the dry state but a measurable current flows in the wet state. Therefore, an accumulation of water in the high-voltage accumulator can also be detected.

Additionally, the frequency of the threshold being exceeded by the electrical measured quantity within a certain period of time can be used as a criterion for differentiating between a mechanical deformation and an accumulation of electrically conductive liquid (multiple triggering in the case of swashing liquid). The threshold being exceeded can be localized if a plurality of sensor elements are used. A swashing electrically conductive liquid can likewise be deduced in the case of a fast sequence of thresholds being exceeded at different sensor elements.

A particularly simple and reliable option for realizing the evaluation device used according to the invention is provided if said evaluation device contains a resistance measuring device for measuring the electrical resistance present between the first measuring contact and the second measuring contact.

The aforementioned object is also achieved by a high-voltage accumulator for a motor vehicle, which contains a detection device according to the preceding description. Further, the object set forth at the outset is achieved by a motor vehicle equipped with such a high-voltage accumulator. Accordingly, the same or similar advantages as those described in conjunction with the above arise, which is why, for the purposes of avoiding repetition, reference is made to the explanations given above in the context of the detection device according to the invention.

DETAILED DESCRIPTION OF THE DRAWINGS

Figure 1:
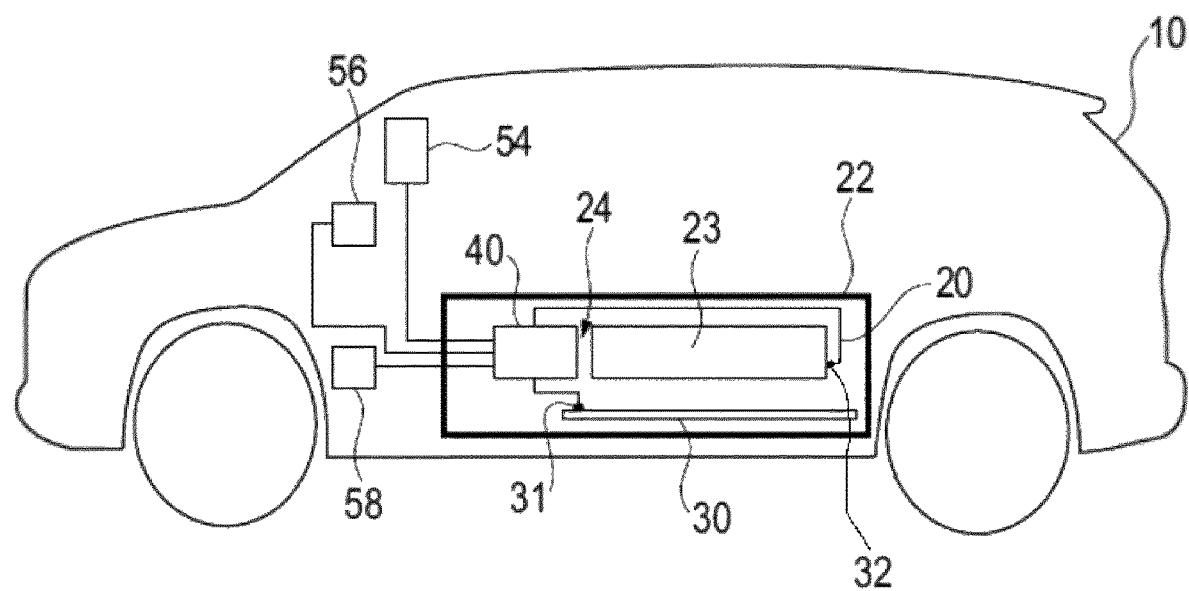
FIG. 1 is a schematic illustration of a detection device according to the invention, in an exemplary arrangement at a high-voltage accumulator that is installed in a motor vehicle.

FIG. 1 illustrates a motor vehicle 10, in which a high-voltage accumulator 20 provided with a detection device 24 is installed. The high-voltage accumulator 20 is situated in a housing 22, which contains a cell module 23. In addition to the detection device 24, the sensor element 30 with a measuring contact 31 and an evaluation device 40 are also provided in the housing 22. The sensor element 30, which is embodied as a film made of a dielectric elastomeric sensor in this example, is disposed on the base of the housing 22; however, it could also be disposed on the cell module 23. The second measuring contact 32 can be provided at an electrically conductive part of the high-voltage accumulator 20, e.g., cell module 23 or inner wall of the housing 22. The first measuring contact 31 and the second measuring contact 32 allow electrical signals to be tapped as an electrical measured quantity (voltage or resistance) by the sensor element 30 and be supplied to an evaluation device 40. A voltage measuring device of the evaluation device 40 measures the voltage between the two measuring contacts 31 and 32. Here, the evaluation device 40 is configured in such a way that it is able to analyze the respectively output measured quantities and identify mechanical contacting between the housing and another component of the high-voltage accumulator therefrom. Examples of specific configurations of the evaluation device 40 and of the sensor element 30 will be described below. Further, the evaluation device 40 is designed in such a way that it can output a warning signal or warning message should it have determined corresponding mechanical contacting. By way of example, the warning message can be brought to the attention of a driver of the motor vehicle 10 in optical fashion by way of an appropriate display 54 and/or in acoustic fashion by way of a suitable loudspeaker 56. Moreover, the warning message can be fed to a controller 58 for the high-voltage accumulator 20 or for the entire motor vehicle 10, where it can be stored and used for a more in-depth analysis or repair instruction—for example in a workshop or at a service center.

Figure 2:
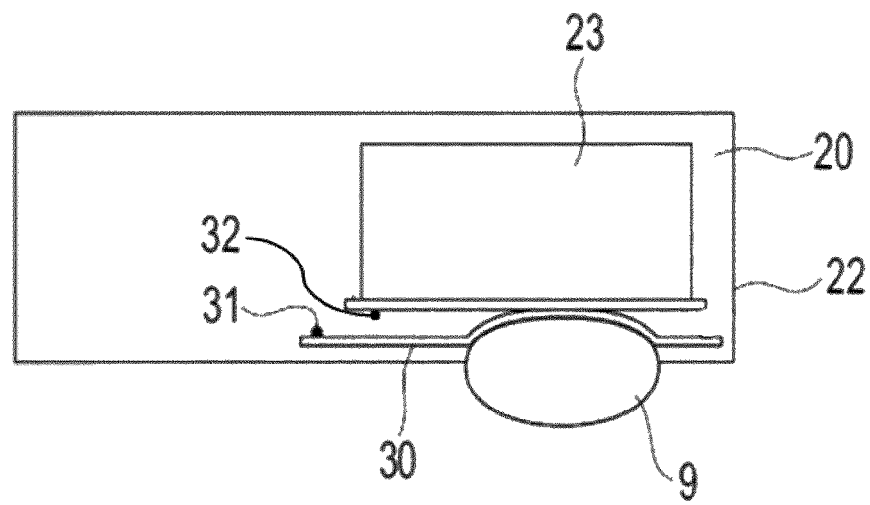
FIG. 2 is a schematic illustration of a first embodiment of a high-voltage accumulator according to the invention, with a sensor element attached therein.

FIG. 2 illustrates a first embodiment of the high-voltage accumulator 20 in a situation where a foreign body 9 has pressed the base of the housing 22 so far upward that the housing 22 presses against, or even deforms, the cell module 23 situated thereover. In this second embodiment, the sensor element 30 is only disposed on the base of the housing 22. The housing of the cell module can be formed from metal. In this case, the surface of the cell module 23 is electrically conductive. In the situated illustrated in FIG. 3, the sensor element 30, and hence also the electrical signals output thereby, are consequently influenced even more strongly by the mechanical contacting.

If the material of a component of the high-voltage accumulator is not electrically conductive per se, an electrically conductive layer can be applied to at least one region of the surface of the component and the second measuring contact 32 must be disposed on said region so that the first measuring contact 31 and the second measuring contact 32 can be electrically connected to one another when the sensor element 30 contacts the electrically conductive region.

If the deformation illustrated in FIG. 2 occurs, two measuring contacts 31 and 32 are electrically connected and the measurement current flows between the two measuring contacts 31 and 32. Therefore, there is a change, as by the voltage measuring device, in the voltage measured between the two measuring contacts 31 and 32. There is a similar change in the resistance between the two measuring contacts 31 and 32. From these circumstances, the evaluation device 40 deduces that a mechanical deformation has occurred and outputs a corresponding warning message to the driver of the motor vehicle 10. By way of example, such a warning message may contain the request to immediately visit a workshop or even to immediately switch off the motor since damage impairing the functionality of the high-voltage accumulator may have occurred.

The voltage and/or resistance values between the two measuring contacts 31 and 32 are detected continuously. It is understood that the respective measurements also be undertaken periodically, i.e., discontinuously, for example.

According to the preceding description, the evaluation device 40, as part of the detection device 24, is likewise housed within the housing 22 of the high-voltage accumulator 20. It is understood that the evaluation device 40 could also be disposed outside of the housing 22. Further, it is conceivable that the sensor element 30 could also be fastened to the outer side of the housing 22.

In addition to the evaluation of the aforementioned measured quantities, it is also possible to take account of the period of time during which there is contacting between the housing of the high-voltage accumulator and a component part, for example. By way of example, a contact time of between 10 ms and 50 ms can be considered a medium deformation and hence medium damage, while a serious defect can be assumed in the case of an even longer contact time (50 ms-100 ms).

The evaluation device of the sensor element should be configured to allow the period of time of a threshold being exceeded by the electrical measured quantity to be detected. This facilitates the differentiation between the two patterns of damage of "detection of mechanical deformation" and "detection of an electrically conductive liquid accumulation". On account of the elastic deformation component in the case of a mechanical deformation, the electrical measured quantity exceeds the threshold for only a short period of time in the case of small to moderate events. This lies in the range below 500 ms, typically below 100 ms. As a consequence, a first warning message with mid urgency can be output to the driver, for example to recommend a timely visit to a workshop.

In the case of a relevant collection of electrically conductive liquid, this period of time lies in the range greater than 500 ms, typically greater than 1 second. Elevated safety criticality arises on account of the risk of a cell-internal short circuit as a consequence of a pronounced deformation or on account of the risk of hydrogen formation and maybe a subsequent oxyhydrogen ignition or explosion as a consequence of an accumulation of electrically conductive liquid. As a result of the distinction in time, a second warning message of high urgency can be output to the driver, e.g., with a request to immediately switch off and leave the vehicle.

Figure 3:
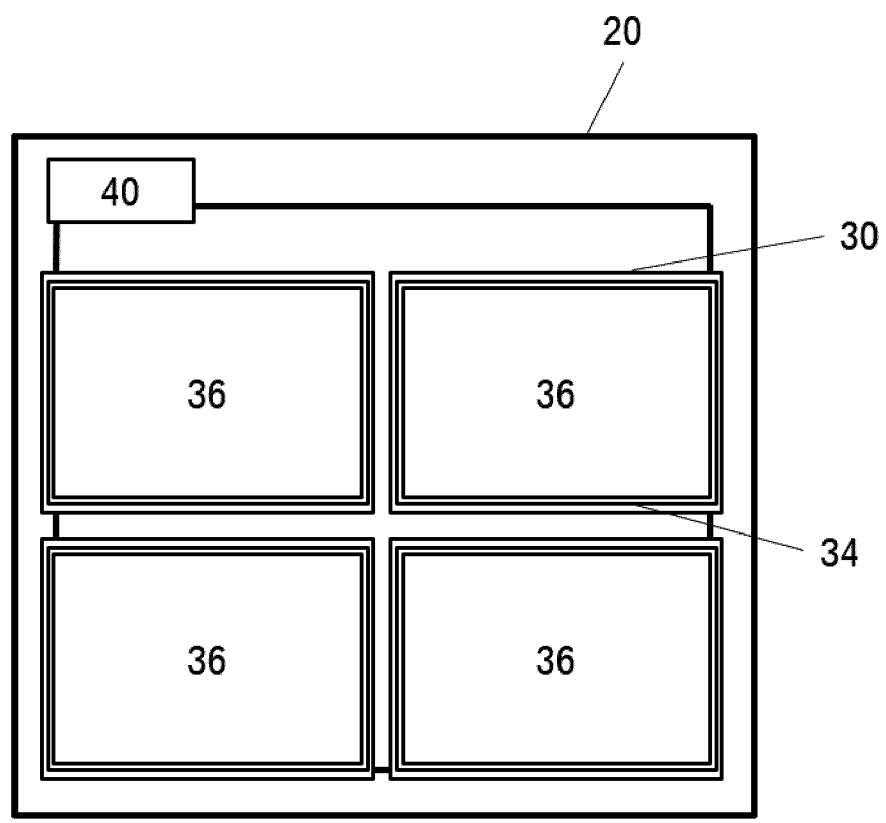
FIG. 3 is a schematic illustration of a second embodiment of a high-voltage accumulator according to the invention, with cell modules and sensor elements.

FIG. 3 shows a second embodiment of the high-voltage accumulator 20, in which an evaluation device 40 and a plurality of cell modules 36 are disposed. The sensor element 30, which has a metal film or an electrically conductive lacquer, is a sensor area that has been applied to the cell module. The sensor element 30 could also be applied to a different component of the high-voltage accumulator 20, e.g., to the inner side of the housing 22.

The sensor element 30 can envelop a cell module and/or cover the entire housing base of the high-voltage accumulator 20 in planar fashion. Alternatively, the sensor element 30 or respective sensor elements 30 can be provided in part, for example in critical component regions, e.g., the inner side of the housing 22, or depending on critical strike zones. Should a sensor element only be attached to a critical partial component (e.g., a cell module) within the high-voltage accumulator (and hence not to the base of the housing 22), a detection of a strong deformation is consequently only possible by way of appropriate contacting.

Should the surface of the component, e.g., the surface of the cell module, be itself electrically conductive and if it is at electrical ground potential, an electrically insulating layer (e.g., a non-conductive film or lacquer) must initially be applied to the cell module in order to separate the electrically conductive layer from ground potential.

A cost-effective type of application could be, for example, a prefabricated aluminum film with an insulating adhesive layer. Should the insulation effect of the adhesive layer be insufficient, it is possible to initially apply a self-adhesive film, e.g., Kapton, PET, etc., and subsequently apply the aluminum adhesive strip. A further alternative lies in lacquering using an electrically insulating layer, e.g., EPD, and the subsequent application of an electrically conductive lacquer.

A combination of a plurality of sensor elements or sensor areas at different potentials may be necessary in order to realize an electrically isolated measuring circuit. The sensor film (sensor element 30) could also be applied to the cell module. Alternatively, the sensor film 30 could also be applied to different areas in the high-voltage accumulator 20, e.g., the inner side of the housing base area and/or at subcomponents to be protected, such as the cooler.

Alternatively, the first component and/or the second component can have a cell module of the high-voltage accumulator or an electronic component or a protection against contact for the high-voltage accumulator or a protection against vibrations for the high-voltage accumulator, wherein the protection against contact for the high-voltage accumulator and/or the protection against vibrations for the high-voltage accumulator has at least one chamber, which serves as a holding device of the electrically conductive sensor area.

The second component has either an electrically conductive surface, at least part of its surface, or an electrically conductive sensor area.

Using the above-described sensor area and the attachment thereof, it is possible to save production costs and the weight or the installation space of the high-voltage accumulator 20 can be reduced. At the same time, robustness of the detection device 24 in relation to load cases above design boundaries can be increased.

In the case of one sensor area or a plurality of sensor areas for covering a plurality of critical regions, it may be advantageous to guide the measurement signal in series through all sensors, and to tap said measurement signal at an output that is separate from the input in order to be able to monitor the electrical connection of the sensors (interlocking principle). By way of example, the sensor areas could be series connected and provided with the resistance to the voltage source at the input and with a sensor line for measuring the voltage at the output. This can ensure that all sensor areas are connected and the evaluation of one sensor line is sufficient to obtain identification for all sensor areas.

Further, an accumulation of water in the high-voltage accumulator 20 (on account of a defective housing or a cooler fracture) can be identified by the detection device 24.

According to the invention, the insulation layer 34 protrudes over the conductive sensor area 30 (FIG. 3) and thus ensures the observance of the clearance and creepage distances to the main component (e.g., cell module 36) to which the sensor has been applied. The electrical resistance between the sensor area 30 and the main component can be set by lengthening or shortening this protrusion in such a way that no current flows in the dry state but a measurable current flows in the wet state. Here, use is made of the conductive property of the coolant (500 μS-4000 μS). In order to be robust against occurring ambient moisture, the measurement path is set in such a way that the situation (e.g., coolant leakage greater than 100 ml) can be identified.

A similar mechanism can be facilitated by microstructuring of the film surface. This facilitates the identification of water over a larger area, and hence at an earlier stage or in more reliable fashion.

Further, the sensor system can also be configured as a dedicated partial system within the respective components of the high-voltage accumulator—for example as a multi-layer housing base.

It should be noted that the features of the invention described with reference to individual embodiments or variants, such as the type and configuration of the individual sensor elements or evaluation devices and the spatial arrangement thereof, can also be present in other embodiments unless something different is specified or this is precluded for technical reasons. Moreover, in relation to such features, described in combination, of individual embodiments, it is not necessary for all features to always be realized in a relevant embodiment.

What is claimed is:

1. A detection device for detecting a mechanical deformation of a high-voltage accumulator of a motor vehicle, comprising:
   a sensor element applied to a first component of the high-voltage accumulator, wherein the sensor element is configured to detect a measured electrical quantity between the sensor element and a second component of the high-voltage accumulator, and wherein at least a region of a surface of the second component is electrically conductive; and
   an evaluation device configured to:
      detect the mechanical deformation from the measured electrical quantity, and
      output a warning message in response to detecting the mechanical deformation.

2. The detection device according to claim 1, wherein sensor element comprises a metal film or an electrically conductive lacquer.

3. The detection device according to claim 1, wherein the first component and/or the second component are embodied as:
- a housing of the high-voltage accumulator,
- a cell module of the high-voltage accumulator,
- a cooler of the high-voltage accumulator,
- an electronic component,
- a protection component against contact for the high-voltage accumulator, or
- a protection component against vibrations for the high-voltage accumulator.

4. The detection device according to claim 3, wherein the sensor element is attached to the inner side of the housing.

5. The detection device according to claim 4, wherein the second component has at least one electrically conductive sensor area.

6. The detection device according to claim 5, wherein the protection component against contact for the high-voltage accumulator and/or against vibrations for the high-voltage accumulator has at least one chamber, which serves as a holder of the electrically conductive sensor area.

7. The detection device according to claim 1, further comprising:
- an electrically insulating layer, wherein the electrically insulating layer is provided between the component of the high-voltage accumulator and the sensor element.

8. The detection device according to claim 1, wherein the sensor element is provided with at least one measuring contact for obtaining and outputting the measured electrical quantity detected by the sensor element.

9. The detection device according to claim 8, wherein the evaluation device comprises a voltage measuring device, resistance measuring device or capacitance measuring device for measuring the measured electrical quantity present between the sensor element and a second measuring contact at the second component.

10. The detection device according to claim 1, wherein the evaluation device detects a time curve of the measured electrical quantity.

11. The detection device according to claim 10, wherein the evaluation device distinguishes between mechanical contacting and an accumulation of an electrically conductive liquid in the high-voltage accumulator by the measured electrical quantity and the time curve thereof.

12. The detection device according to claim 11, wherein the evaluation device decides that mechanical contacting has occurred if the time duration of exceeding or dropping below a predefined threshold is less than 500 ms.

13. The detection device according to claim 12, wherein the evaluation device decides that an accumulation of electrically conductive liquid in the high-voltage accumulator has occurred if the time duration of exceeding or dropping below a predefined threshold is more than 500 ms.

14. The detection device according to claim 12, wherein the predefined threshold is less than 100 ms.

15. The detection device according to claim 11, wherein the evaluation device decides that an accumulation of electrically conductive liquid in the high-voltage accumulator has occurred if the time duration of exceeding or dropping below a predefined threshold is more than 500 ms.

16. The detection device according to claim 15, wherein the predefined threshold is more than 1000 ms.

17. A high-voltage accumulator for a motor vehicle comprising a detection device according to claim 1.

18. An electric vehicle or a hybrid vehicle, comprising a high-voltage accumulator according to claim 17.

* * * * *